(12) United States Patent
Ocsenknecht et al.

(10) Patent No.: US 6,971,452 B2
(45) Date of Patent: Dec. 6, 2005

(54) DEVICE FOR CONTROLLING THE POSITION OF A MOUNTABLE IMPLEMENT RELATIVE TO AN IMPLEMENT CARRIER ELEMENT

(75) Inventors: Daniel Ocsenknecht, Siegburg (DE); Karl Coenen, Siegburg (DE); Matthias Grimsel, Dresden (DE)

(73) Assignee: GKN Walterscheld GmbH, (DE)

( * ) Notice: Subject to any disclaimer, the term of this patent is extended or adjusted under 35 U.S.C. 154(b) by 47 days.

(21) Appl. No.: 10/683,324

(22) Filed: Oct. 10, 2003

(65) Prior Publication Data

US 2004/0149461 A1 Aug. 5, 2004

(30) Foreign Application Priority Data

Oct. 10, 2002 (DE) .............................. 102 47 273

(51) Int. Cl.[7] .............................................. A01B 59/00
(52) U.S. Cl. ...................... 172/439; 172/7; 56/10.2 E
(58) Field of Search ...................... 56/10.2 R, 10.2 D, 56/10.2 E, 10.2 F, DIG. 10; 172/4, 4.5, 439–451

(56) References Cited

U.S. PATENT DOCUMENTS

| | | | |
|---|---|---|---|
| 4,120,364 A * | 10/1978 | Wooldridge | 172/2 |
| 4,535,847 A * | 8/1985 | Hasegawa et al. | 172/2 |
| 4,553,605 A * | 11/1985 | Katayama et al. | 172/2 |
| 4,607,716 A * | 8/1986 | Beck | 180/401 |
| 4,809,487 A * | 3/1989 | Junge et al. | 56/10.2 E |
| 4,825,956 A * | 5/1989 | Kanato et al. | 172/2 |
| 4,944,141 A * | 7/1990 | Orlando et al. | 56/17.1 |
| 5,579,850 A * | 12/1996 | Kimura et al. | 172/4 |
| 6,076,611 A * | 6/2000 | Rozendaal et al. | 172/4 |
| 6,202,395 B1 * | 3/2001 | Gramm | 56/10.2 E |
| 6,378,620 B1 * | 4/2002 | Luca et al. | 172/4 |
| 6,389,345 B2 * | 5/2002 | Phelps | 701/50 |
| 6,594,978 B2 * | 7/2003 | Viaud | 56/10.2 E |

FOREIGN PATENT DOCUMENTS

DE  100 11 499 A1  9/2001

* cited by examiner

*Primary Examiner*—Thomas B. Will
*Assistant Examiner*—Nathan Mammen
(74) *Attorney, Agent, or Firm*—Harness, Dickey & Pierce, P.L.C.

(57) ABSTRACT

A device for controlling the position of a mountable implement relative to an implement carrier vehicle has a mountable implement (2, 3, 4) which can be moved at a predetermined height by the implement carrier 1 following the ground. A support element (11, 19, 20), is coupled to the mountable implement (2, 3, 4) and can be attached to the implement carrier vehicle (1). A coupling device (15, 17, 18), is connected to the mountable implement (2, 3, 4) and to the support element (11, 19, 20). The mountable implement (2, 3, 4) is freely adjusted to a lifting position corresponding to the height path relative to the support element (11, 19, 20). An attachment device (6, 7, 8) attaches the support element (11, 19, 20) to the implement carrier vehicle 1 having a lifting device. A sensor determines the actual lifting position of the mountable implement (2, 3, 4) relative to the support element (11, 19, 20). A control device determines the deviation of the actual lifting position from a desired lifting position. The lifting device adjusts the support element (11, 19, 20) to a height position where the mountable implement (2, 3, 4) takes up the desired lifting position.

13 Claims, 1 Drawing Sheet

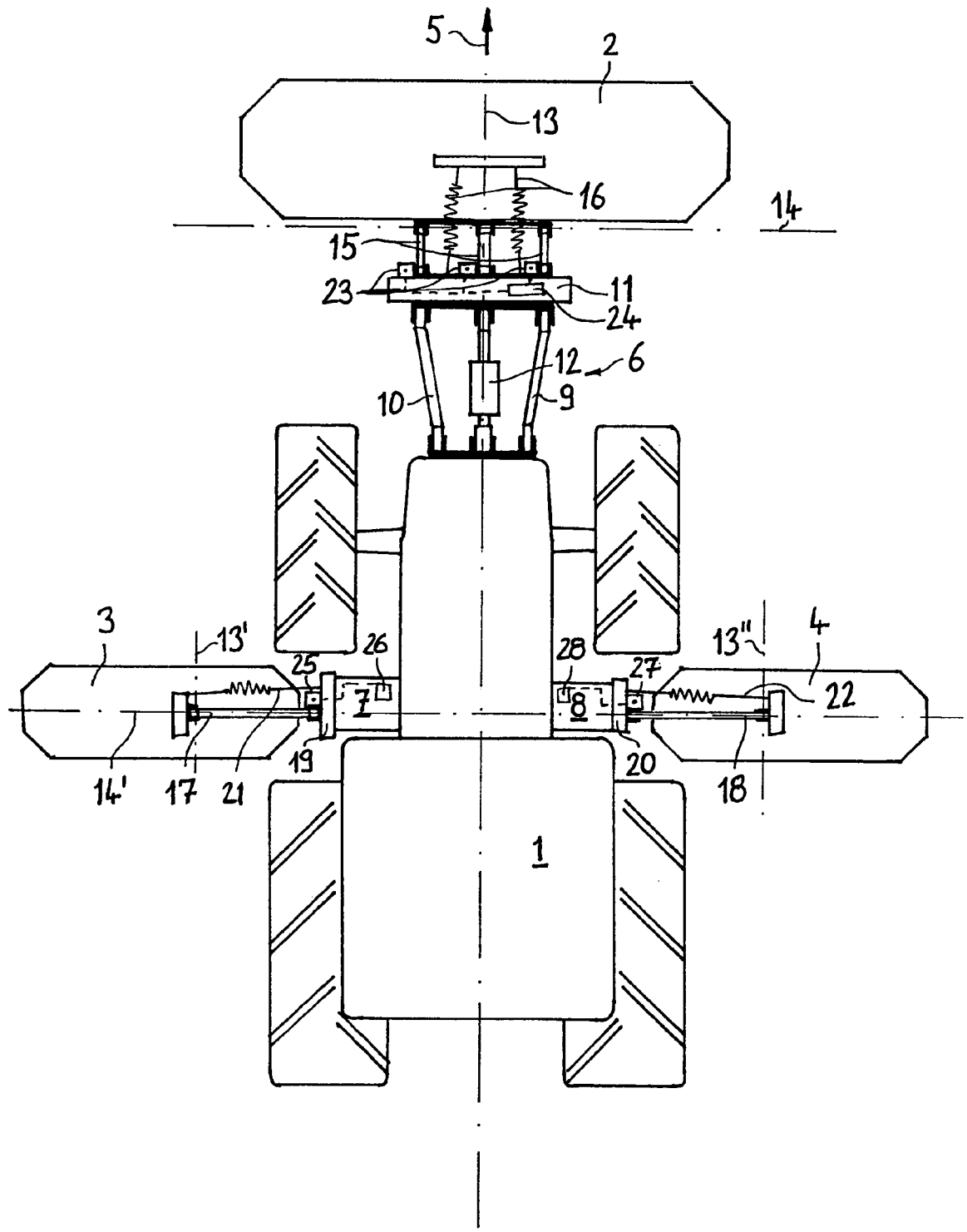

DEVICE FOR CONTROLLING THE POSITION OF A MOUNTABLE IMPLEMENT RELATIVE TO AN IMPLEMENT CARRIER ELEMENT

CROSS-REFERENCE TO RELATED APPLICATIONS

This application claims priority to German Patent Application No. 10247273.4 filed Oct. 10, 2002 which application is herein expressly incorporated by reference.

FIELD OF THE INVENTION

The invention relates to a device for controlling the position of a mountable implement relative to an implement carrier vehicle, especially a tractor. The control of the position of the mountable implement is necessary to follow the contour of the ground. The mountable implement, when it is moved by a tractor along the ground with an uneven ground contour, should be prevented from lifting off the ground or being pressed, with an abutment force which is too large, into the ground.

BACKGROUND OF THE INVENTION

Known systems which follow the ground contour include, for example, a carrier frame attached to a three-point coupling of a tractor. The carrier frame takes up a working device, for example, a mower where the mower is connected, via several links, to the carrier frame. The links are arranged in the form of a parallelogram so that the mountable implement is lifted or lowered in reference to the carrier frame when driven along the ground. The mountable implement freely abuts the ground with a spring arrangement serving to reduce the abutment force. The mountable implements are, in this case, movable between two maximal displacement positions between two limit stops. At extreme height differences of the path of the ground, it is therefore possible, that the mountable implement is lifted up until reaching the upper stop limit. In this situation the whole carrier frame is lifted manually by means of the three-point coupling to prevent damage of the mountable implement.

Besides the above passive ground following systems, active systems are known. Here, the ground contour is determined via sensors. The sensors transmit signals to lift or lower the working implement depending on the received data. Such a system is known from DE 100 11 499 A1. A device is shown for following the ground of a front attachment implement on a combine-harvester and forage harvester. A pivotable stalk divider is provided on the front attachment implement. The pivoting position relative to the front attachment implement is determined by a sensor. Accordingly, independent of the measured pivoting angle, the front attachment implement, arranged behind the stalk divider, is lifted or lowered hydraulically. The disadvantage is, however, that because of the time-delayed control behavior of the hydraulic system, the sensor, when viewed in the working direction has to be arranged as far as possible in front of the mountable implement. Thus, at higher driving speeds the front attachment implement cannot be controlled early enough to ensure exact following of the ground.

SUMMARY OF THE INVENTION

It is an object of the present invention to provide a device to control the position of a mountable implement relative to an implement carrier vehicle to follow the ground with a smaller time delay and a balanced height difference.

A device to control the position of a mountable implement relative to an implement carrier vehicle, especially a tractor, comprises a mountable implement movable by the implement carrier vehicle in a working direction to follow the ground at a predetermined height above the ground. A support element may be coupled to the mountable implement and attached to the implement carrier. A coupling device couples the mountable implement to the support element. The mountable implement is adjusted dependent upon the vertically free height path of the ground in its corresponding lifting position relative to the support element.

An attachment device attaches the support element to the implement carrier vehicle. A lifting device lifts and lowers the support element. A sensor determines the respective actual lifting position of the mountable implement relative to the support element. A control device determines the deviation of the actual lifting position from the predetermined desired lifting position of the mountable implement relative to the support element. The lifting device guides the support element to a height position where the mountable implement takes up the desired lifting position.

Thus, two devices are provided to follow the ground. The coupling device enables the mountable implement to be freely adjusted relative towards the carrier element. This is a passive system and is not actively controlled. The attachment device has its height position of the carrier element actively adjusted by the lifting device. The height position of the carrier element is adjusted independent of the lifting position of the mountable implement relative to the carrier element. Therefore, the active system (the attachment device) is determined by the movement of the passive system (the coupling device).

The coupling device ensures, in the range of lower height differences of the height path of the ground, a quicker adjustment of the position of the working implement without a time delay. Limit stops are provided to limit the movement of the mountable implement with reference to the support element. The free adjustment is superimposed by the coupling device by an active adjustment of the attachment device to balance larger height differences.

The mountable implement can rest, with a sliding face, on the ground. The mountable implementation can be moved along the ground, as for example in the case of a mower. Furthermore, the mountable implement can have wheels, which rolls along the ground.

In cases where a mower is used that is slidingly moved over the ground, a spring arrangement is provided to adjust the abutment force of the mountable implement onto the ground. The spring arrangement provides a lifting force onto the mountable implement.

The coupling device may include at least one arm. The arm may be connected in an articulated manner to the support element. Alternatively, the arm, in an articulated manner, may be connected to the mountable implement. The sensor has an angle-sensor to determine the angular position of the arm relative to the support element. Coupling devices where several arms are provided to enable predetermined kinematic movements, are also possible.

The attachment device can be represented by a three-point-coupling with two lower links and one upper link. The two lower links can each be lifted and lowered independently from each other by a respective lifting device. Further, the upper link can be freely adjustable in its length. Other attachment devices, for example four-point couplings, are also possible.

To enable a transversal ground following, the mountable implement can be pivoted dependent upon the path of the ground transversally to the working direction freely in reference to the support element around a roll axis, aligned in the working direction.

In this case, the free adjustability of the mountable implement around the roll axis can be superimposed by an active adjustment of the attachment device. Here a rolling angle sensor is provided. The sensor determines the actual rolling angle position of the mountable implement relative to the support element. The control device determines the deviation of the actual rolling angle position from a predetermined desired rolling angle position of the mountable implement. The lifting device guides the lower links, respectively, to a height position independent of each other. The support element takes up a position where the mountable implement takes up the desired rolling angle position.

The mountable implement can be pivoted around an axis arranged coaxially to the roll axis. Furthermore, the coupling device may include two arms. The arms, respectively, are connected on the one hand, in an articulated manner, to the support element and on the other hand, in an articulated manner, to the mountable implement. In this case the rolling angle sensor includes two angle sensors. Each sensor determines the angle position of one arm relative to the support element.

Further the mountable implement can be freely pivoted, dependent upon the path of the ground, relative to the support element around a pitching axis, aligned transversally to the working direction. Therefore, when using a mower as a mountable implement, the cutting angle is adjustable.

Here, a pitching angle sensor can be provided. The sensor determines the respective actual pitching angle position of the mountable implement relative to the support element. The control device determines the deviation of the actual pitching angle position from a predetermined desired pitching angle position of the mountable implement. A device for adjusting the length of the upper link guides the support element to a position where the mountable implement takes up the desired pitching angle position.

Further, a working implement with at least two of the above named devices is proposed. The mountable implements of the devices are arranged one behind the other in the working direction. The control devices of the devices are coupled to each other in such a way, that a signal, corresponding to the actual lifting position of the mountable implement, arranged at the front in working direction, is transmitted to the control devices of the devices, arranged behind the same.

Further, the control devices of the devices are coupled to each other in such a way, that a signal, corresponding to the actual rolling angle position of the mountable implement arranged at the front, is transmitted to the control devices of the devices arranged behind the same. Furthermore, the control devices of the devices are coupled in such a way to each other, that a signal, corresponding to the actual pitching angle position of the mountable implement arranged at the front, is transmitted to the control devices of the devices, arranged behind the same.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

The FIGURE is a schematic view of a tractor carrying implements in accordance with the present invention.

DETAILED DESCRIPTION OF THE PREFERRED EMBODIMENTS

The figures show an implement carrier vehicle in the form of an agricultural tractor 1, driven in a working direction 5. A first mountable implement 2, a second mountable implement 3 as well as a third mountable implement 4 are connected to the tractor. The mountable implements 2, 3, 4 are arranged at a predetermined height above the ground and follow the height path of the ground. The mountable implements 2, 3, 4 can be represented by mowers, which rest on the ground and are slidingly moved along the ground.

The first mountable implement 2 is connected to the front side of the tractor 1 by a first attachment device 6. The second mountable implement 3 is connected via a second attachment device 7 and the third mountable implement 4 is connected via a third attachment device 8 to the tractor 1, respectively.

The first attachment device 6 is represented in the form of a three-point coupling (hitch) having two lower links 9, 10 as well as an upper link 12. The lower links 9, 10 as well as the upper link 12 are, respectively, connected in an articulated manner to the tractor 1 and to the first support element 11. The lower links 9, 10 can be lifted and lowered independently of each other by lifting devices. Therefore, the height position of the support element 11 can be adjusted with reference to the tractor 1 and therefore, relative to (above) the ground. Via different lifting positions of the lower links 9, 10, the first support element 11 can be pivoted around a roll axis 13. The roll axis 13 is aligned in working direction 5.

The upper link 12 is formed as a double acting hydraulic cylinder. The length on the cylinder can be freely adjusted. The first support element 11 can also be pivoted around a pitching axis 14, arranged transversally to the working direction 5.

The first mountable implement 2 is movably connected via first arms 15, which are part of a first coupling device, to the first support element 11. The first arms 15 provide a lifting movement of the first mountable implement 2 relative to the first support element 11. Also, the first arms 15 enable a rolling movement around the roll axis 13 and a pitching movement around the pitching axis 14. Accordingly, the first arms 15 are, respectively, connected in an articulated manner to the first support element 11 as well as to the first mountable implement 2. Thus, the first mountable implement 2 is freely movable with reference to the first support element 11 independent of the height path of the ground.

A first spring arrangement 16 is provided to adjust the abutment force of the first mountable implement 2 onto the ground. The first spring arrangement 16 is attached to the first mountable implement 2 and to the first support element 11. The first spring arrangement 16 provides a lifting force to the first mountable implement 2.

The second mountable implement 3 is connected via a second arm 17 to the second support element 19 on one side of the tractor 1. The second support element 19 is connected via a second attachment device 7 to the tractor 1. In this case, the second arm 17 is part of a second coupling device. A second spring arrangement 21 is provided to adjust the loading force of the second mountable implement 3 onto the ground. The second spring arrangement 21 is connected to the second support element 19 and to the second mountable implement 3. The latter is loaded by a lifting force.

The third mountable implement 4 is connected via a third arm 18 to a third support element 20 on the other side of the tractor 1. The third arm 18 is part of a third coupling device. A third spring arrangement 22 is provided to adjust the abutting force of the third mountable implement 4 as in the second mountable implement 3.

Angle sensors 23 are provided between the first arms 15 and the first support element 11. The sensors 23 measure the angle position of the first arms 15 relative to the first support element 11. These represent the lifting position of the first mountable implement 2 relative to the first support element 11. The lower links 9, 10 are lifted or lowered to prevent large movements of the first mountable implement 2 relative to the first support element 11. A control device 24 is used to accomplish the lifting. The control value of the control represents the lifting position of the first mountable implement 2 with reference to the first support element 11, which is represented by the measured angle of the angle sensors. The disturbance value in form of the changing ground contour acts on the control value. As the first mountable implement 2 follows the ground contour, it can be freely pivoted on the first support element 11. The height position of the lower links 9, 10 is varied according to an adjustment value.

Further, rolling movements of the first mountable implement 2 can be determined with reference to the first support element 11 at two first arms 15 distanced to each other by the angle sensors. The lower links 9, 10 are controlled independently of each other, but independent of the measured angles at the first arms 15 to height positions, where the first mountable implement 2 takes up the desired rolling angle to arrive at a desired rolling angle of the first mountable implement 2 in reference to the first support element 11.

Furthermore, a sensor 23 for the pitching movement can be provided, to achieve a desired pitching angle of the first mountable implement 2 relative to the first support element 11. Accordingly, the length of the upper link 12 is adjusted.

The lifting positions of the second mountable implement 3 and the third mountable implement 4 can also be measured by sensors 25, 27 and control devices 26, 28 to act onto the respective attachment devices 7, 8.

The first mountable implement 2, the second mountable implement 3 and the third mountable implement 4 are arranged behind one another, when viewed in the working direction. Thus, the measured values, which represent the lifting positions, the rolling angles as well as the pitching angles of the first mountable implement 2, arranged furthest at the front, can be transmitted to control devices of the second and third attachment devices 7, 8. Thus, quick adjustment values can act on the second and third attachment devices 7, 8, before the sensors on the second or third mountable implement 3, 4 determine a deviation of the actual values from the desired values.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A device for controlling the position of a mountable implement relative to an implement carrier vehicle comprising:
   at least one mountable implement movable by the implement carrier vehicle in a working direction following the ground at a predetermined height above the ground,
   a support element to be coupled to the mountable implement and to be attached to the implement carrier;
   a coupling device coupled with the mountable implement and the support element, said at least one mountable implement being freely vertically adjustable dependent upon the height path of the ground in its corresponding lifting position relative to the support element;
   an attachment device coupled to the support element and to be attached to the implement carrier vehicle;
   a lifting device for lifting and lowering the support element;
   a sensor determining the respective actual lifting position of the mountable implement relative to the support element; and
   a control device determining the deviation of the actual lifting position from a predetermined desired lifting position of the mountable implement relative to the support element said lifting device guiding the support element to a height position where the mountable implement takes up the desired lifting position.

2. The device according to claim 1, wherein the at least one mountable implement rests with a sliding face on the ground and can be moved along the ground.

3. The device according to claim 2, wherein a spring arrangement is provided for adjusting an abutment force of the mountable implement onto the ground, said spring arrangement provides a lifting force onto the mountable implement.

4. The device according to claim 1, wherein the coupling device has at least one arm on a first end connected in an articulated manner to the support element and a second end connected in an articulated manner to the mountable implement and said sensor comprises an angle-sensor for determining the angle position of the arm relative to the support element.

5. The device according to claim 1, wherein the attachment device is a three-point-coupling with two lower links and one upper link.

6. The device according to claim 5, wherein the at least one mountable implement can be freely pivoted with reference to the support element around a roll axis aligned in the working direction dependent upon the path of the ground transversally to the working direction.

7. The device according to claim 6, wherein a rolling angle sensor is provided to determine the actual rolling angle position of the at least one mountable implement relative to the support element and said control device determines the deviation of the actual rolling angle position from a predetermined desired rolling angle position of the at least one mountable implement and said lifting device guides the lower links, respectively, to a height position, independent of each other, in which the support element takes up a position where the mountable implement takes up the desired rolling angle position.

8. The device according to claim 5, wherein the coupling device has two arms, which, respectively, are connected at one end, in an articulated manner, to the support element and at the other end in an articulated manner, to the mountable implement, and said rolling angle sensor comprises two angle sensors for determining the angle position of the two arms relative to the support element.

9. The device according to claim 1, wherein the at least one mountable implement can be freely pivoted dependent upon the path of the ground relative to the support element around a pitching axis aligned transversally to the working direction.

10. The device according to claim 9, wherein a pitching angle sensor is provided for determining the respective actual pitching angle position of the at least one mountable implement relative to the support element and said control device determines the deviation of the actual pitching angle position from a predetermined desired pitching angle position and a device for adjusting the length of the upper link guides the support element towards a position where the at least one mountable implement takes up the desired pitching angle position.

11. A working implement with at least two devices according to claim 1, wherein mountable implements for the devices are arranged one behind the other in working direction, and control devices of the devices are coupled to each other such that a signal, corresponding to the actual lifting position of the mountable implement arranged at the front in working direction is transmitted to the control devices of the devices, arranged behind the front mountable implement.

12. A working implement with at least two devices according to claim 11, wherein the control devices of the devices are coupled to each other such that a signal corresponding to the actual rolling angle position of the mountable implement arranged at the front is transmitted to the control devices of the devices arranged behind the front mountable implement.

13. A working implement with at least two devices according to claim 11, wherein the control devices of the devices are coupled with each other such that a signal corresponding to the actual pitching angle position of the mountable implement arranged at the front is transmitted to the control devices of the devices arranged behind the front mountable implement.

* * * * *

UNITED STATES PATENT AND TRADEMARK OFFICE
CERTIFICATE OF CORRECTION

PATENT NO. : 6,971,452 B2
DATED : December 6, 2005
INVENTOR(S) : Ochsenknecht et al.

It is certified that error appears in the above-identified patent and that said Letters Patent is hereby corrected as shown below:

<u>Title page,</u>
Item [75], Inventors, "Daniel Ocsenknecht" should be -- Daniel Ochsenknecht --.

Signed and Sealed this

Fourth Day of April, 2006

JON W. DUDAS
*Director of the United States Patent and Trademark Office*

UNITED STATES PATENT AND TRADEMARK OFFICE
CERTIFICATE OF CORRECTION

PATENT NO. : 6,971,452 B2  
APPLICATION NO. : 10/683324  
DATED : December 6, 2005  
INVENTOR(S) : Ochsenknecht et al.

It is certified that error appears in the above-identified patent and that said Letters Patent is hereby corrected as shown below:

<u>Title Page</u>
Item [73] Assignee: "GKN Walterscheld GmbH" should be --GKN Walterscheid GmbH--

Signed and Sealed this

Twenty-eighth Day of November, 2006

JON W. DUDAS  
*Director of the United States Patent and Trademark Office*